United States Patent [19]
Orpana

[11] 3,993,366
[45] Nov. 23, 1976

[54] VEHICLE TRACKS

[75] Inventor: Robert J. Orpana, Ste. Foy, Canada

[73] Assignee: Panatrac Manufacturing Corporation Ltd., Markham, Canada

[22] Filed: July 7, 1975

[21] Appl. No.: 594,139

[52] U.S. Cl. .............................. 305/35 R; 305/42; 305/57
[51] Int. Cl.² ...................................... B62D 55/20
[58] Field of Search ................. 305/35 R, 36–38, 305/42, 53, 56–59, 39; 74/229, 243 NC, 245 R, 245 P, 247, 250 S; 180/9.62

[56] References Cited
UNITED STATES PATENTS

| | | | |
|---|---|---|---|
| 3,467,446 | 9/1969 | Seelbach et al. | 305/57 |
| 3,539,230 | 11/1970 | Comellas | 305/56 X |
| 3,578,823 | 5/1971 | Clymer | 305/42 |

*Primary Examiner*—Robert B. Reeves
*Assistant Examiner*—John P. Shannon
*Attorney, Agent, or Firm*—Rogers, Bereskin & Parr

[57] ABSTRACT

An endless track for a tracked vehicle is described. The track is of modular form and includes traction elements and track guiding elements. The elements are arranged in rows and are positioned symmetrically with respect to the longitudinal median line of the track, whereby the track is loaded symmetrically in use.

8 Claims, 14 Drawing Figures

VEHICLE TRACKS

This invention relates generally to endless tracks for tracked vehicles. In particular, the invention is concerned with so-called "modular" tracks (also called "segmented" tracks which are made up of a plurality of track elements pivotally coupled together.

In conventional modular tracks, the track elements are arranged in rows and the elements in each row are staggered longitudinally of the track with respect to the elements in adjacent row(s). As a result of this staggered configuration, when the track is in use, the pattern of road wheel to track element contact alternates from side to side of the track producing a torsional moment with respect to the longitudinal axis of the track. This causes the track to twist laterally as each road wheel advances. The track itself and the ground over which the vehicle is moving is therefore loaded in uneven fashion. Twisting of the track also causes poor guidance of the track with respect to the road wheels of the vehicle.

A further disadvantage of this staggered track element arrangement is that it results in unsymmetrical force generation into the track by its driving sprocket. This unbalanced force generation coupled with the lateral twisting of the track produces torsional movements which causes serious wear and stress problems in the pivotal connections between the track elements.

From the point of view of the ground surface over which the track moves, lateral twisting of the track and uneven loading produces an uneven track to ground engagement pattern. In turn, this results in poor traction and severe disturbance of the ground surface.

Canadian patent no. 896,431 entitled "Endless track for tracked vehicles" discloses a modular track having staggered track elements.

An object of the present invention is to provide an improved endless track for a tracked vehicle.

According to the invention, the track includes a plurality of modular track elements including (a) traction elements adapted for engagement with the ground and presenting upper road wheel contact surfaces, and (b) guiding elements adapted to locate the track laterally in use. Means are provided coupling the track elements together in an endless configuration. The coupling means define pivot axes which extend transversely of the track and which are arranged so that each element is pivotable about two such axes located adjacent respectively opposite ends of the element. The traction elements are arranged in a plurality of parallel rows extending longitudinally of the track. The track guiding elements are arranged in at least one row parallel to said rows of traction elements. The arrangement of the elements is symmetrical about a longitudinal median line of the track and at least two of said rows of traction elements are located on respectively opposite sides of said line of symmetry. Accordingly, the road wheel contact area defined by the upper surfaces of the traction elements is disposed symmetrically of the track so that, in use, the track is loaded symmetrically by road wheels on a vehicle to which the track is fitted.

The expression "modular" as used in relation to the track elements of the present invention means that the distance between the pivot axes of each element is the same in every case.

The invention will be better understood by reference to the accompanying drawings which illustrate various embodiments of the invention by way of example, and in which.

Figure 1:
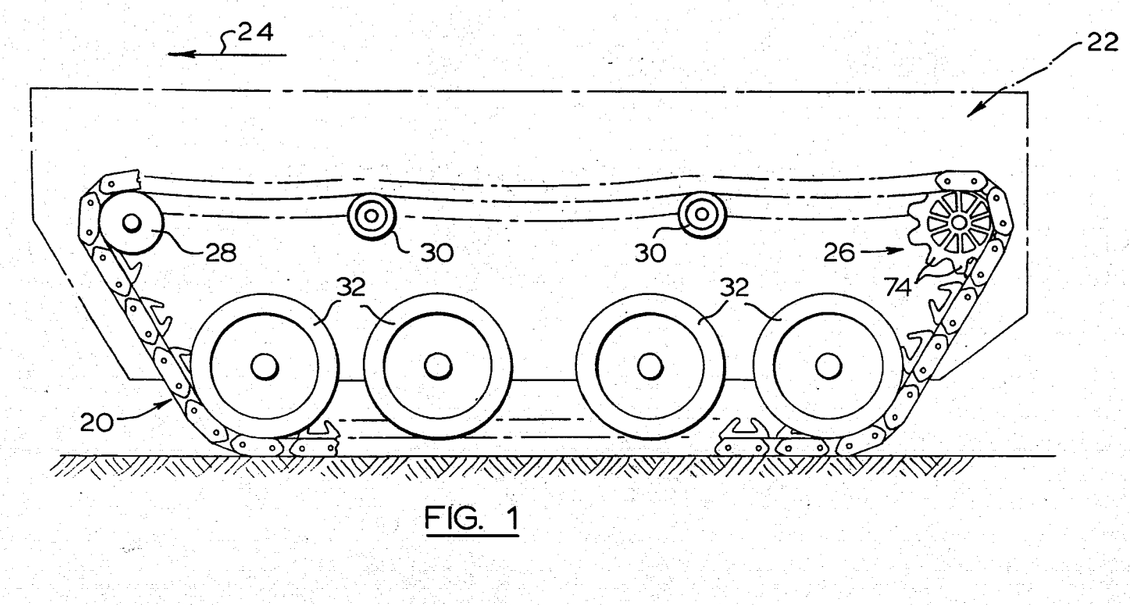
FIG. 1 is a diagrammatic illustration of a tracked vehicle fitted with an endless modular track according to the invention.

Referring first to FIG. 1, the track is generally indicated at 20 and is fitted to a conventional tracked vehicle 22. The vehicle itself forms no part of the present invention and is therefore illustrated in ghost outline only. The direction of forward motion of the vehicle is indicated by arrow 24. The vehicle is fitted with a drive sprocket 26 which drivably engages the track 20 and which is located adjacent the rear end of the vehicle. Adjacent the front end of the vehicle, the track passes around an idler wheel 28. The upper run of the track between sprocket 26 and wheel 28 is supported by idlers 30. Four road wheels 32 run on the upper surface of the lower run of the track.

It will of course be appreciated that FIG. 1 shows one side of the vehicle only and that a second, similar track arrangement is provided at the opposite side of the vehicle.

Figure 2:
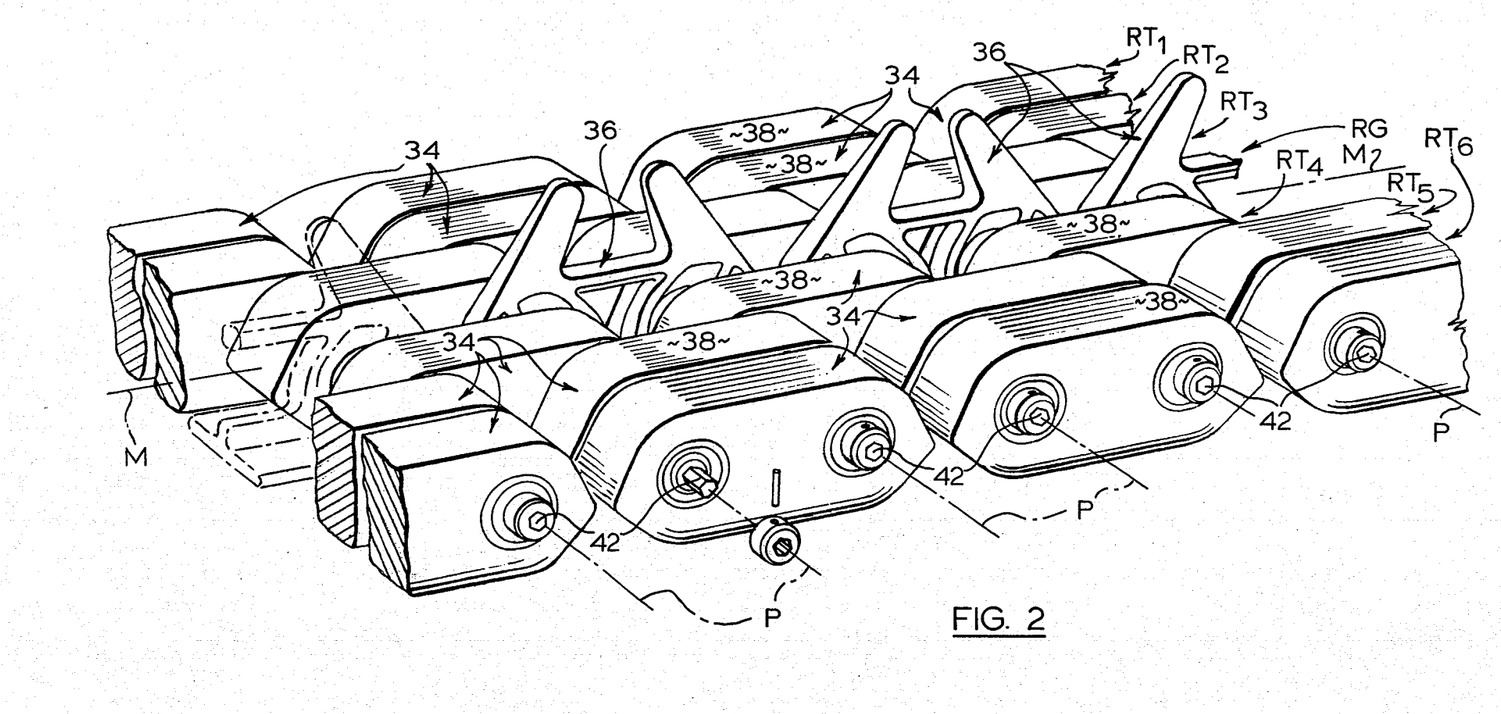
FIG. 2 is a perspective view of a section of the track shown in FIG. 1.

Referring now more particularly to FIG. 2, the track is made up of a plurality of track elements of two types: (a) traction elements and (b) guiding elements. The elements are modular in the sense that each element occupies a similar area of the track. The elements are coupled together by coupling means (to be described) which define pivot axes P extending transversely of the track. In FIG. 2 the traction elements are denoted 34 and the guiding elements are denoted 36. Both the traction elements and the guiding elements engage the ground when the track is in use. The traction elements present upper surfaces 38 on which the road wheels 32 of the vehicle run. The guiding elements serve to locate the track laterally and guide it onto the sprocket 26 in use as will be described. In this embodiment, the guiding elements 36 also perform a track driving function in that they are engaged by the drive sprocket 26 of the vehicle for the purpose of driving the track as will be described.

As can be seen from FIG. 2, the traction elements 34 are arranged in six parallel rows $RT_1$-$RT_6$ and the track guiding elements are arranged in a single row of $RG_1$ parallel to said rows of traction elements. The elements are also arranged symmetrically about the longitudinal median line M of the track. The row $RG_1$ of guiding elements is disposed on said median line and three rows of traction elements are disposed on each opposite side of the line. As a result of this symmetrical arrangement, the road wheel contact area defined by the upper surfaces of the traction elements is symmetrical with respect to said median line M. Accordingly, the track is loaded symmetrically in use by the road wheels 32 of the vehicle 22.

Figures 3, 5:
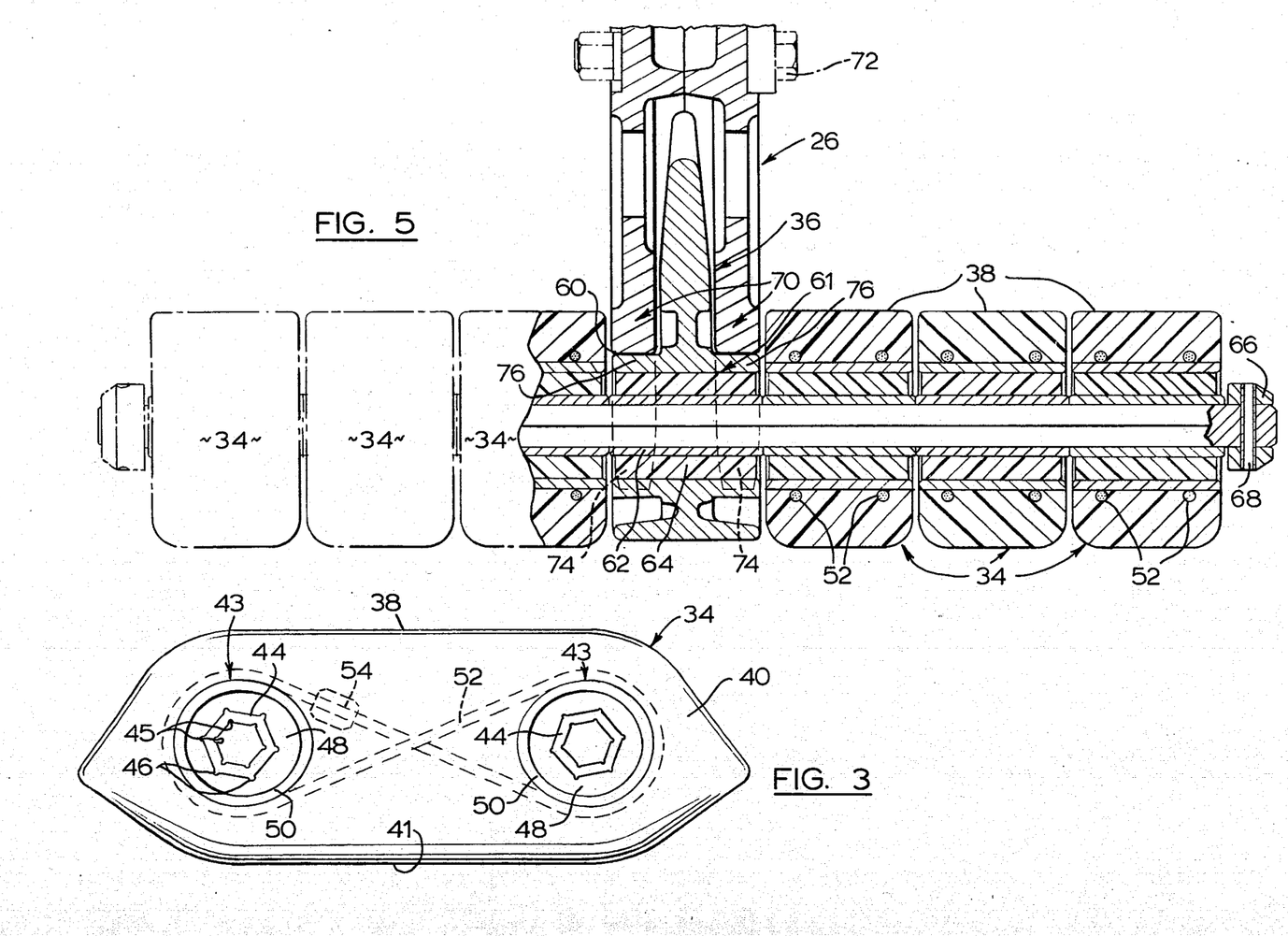
FIG. 3 is a side view of one of the traction elements of the track of FIG. 2.
FIG. 5 is a partial vertical sectional view generally on line V—V of FIG. 1.

FIG. 3 shows one of the traction elements 34 of the track in side view. The element is in the form of an elastomeric module comprising a moulded body 40 of resilient elastomeric material. The body is moulded to the shape shown in FIG. 3 and has tapered ends as can be seen. The body 40 is adapted for contact with the ground in use and includes a lower ground engaging surface 41. In the assembled track, the track elements are coupled by shafts 42 which extend transversely of the track and which are coupled to the traction elements 34 and to the guiding elements 36. As can be seen, two such shafts 42 extend through each traction element.

The shafts are received in two corresponding coupling assemblies 43 positioned adjacent respectively opposite ends of the elements as can be seen from the drawings. Each shaft 42 is of hexagonal shape in cross-section and is received in a hardened steel sleeve 44 of generally complimentary shape. As can be seen, the inner surface of sleeve 44 is formed with longitudinal recesses 45 at the corners of the hexagon defined by the sleeve. These recesses make for easier fitting of the shaft 42 into the sleeve in that the recesses accommodate any imperfections at the corner of the shaft. The corners of the hexagonal outer surface of sleeve 44 are formed with small protrusions 46 complementary to the recesses mentioned above.

Each sleeve 44 is bonded inside a bush 48 which is also of an elastomeric material and which is of elliptical shape in cross-section as can be seen from FIG. 3. The bush 48 is in turn bonded inside an elliptical outer sleeve 50 which is moulded into the elastomeric body 40 of the traction element and is bonded to the material from which the element is made.

Moulded inside the elastomeric body 40 are two cables 52 (only one of which is visible in FIG. 3). Each cable is looped around both of the sleeves 50 in a crossed configuration and the opposed ends of the cable are joined by a sleeve 54. The cables act as tension members inside the traction element.

The elastomeric traction element described above forms the subject of co-pending patent application Ser. No. 594,140 of even date herewith entitled "Traction element for a vehicle track".

Figure 4:
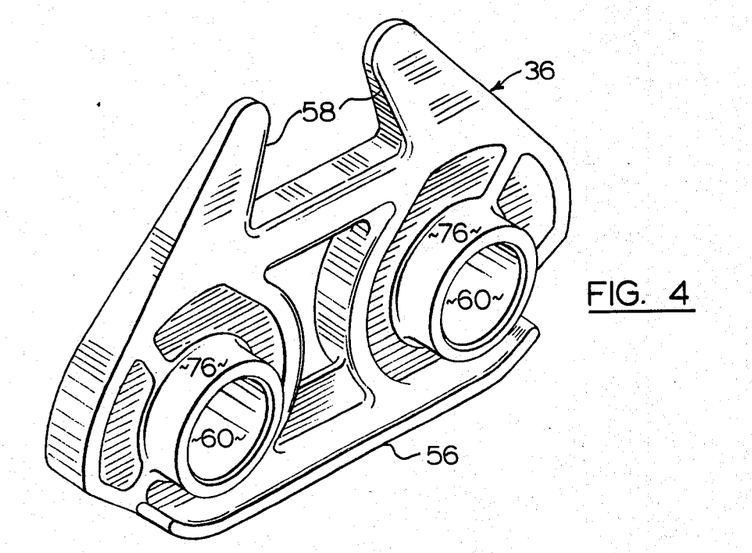
FIG. 4 is a perspective view of one of the track guiding elements of the track of FIG. 2.

FIG. 4 shows one of the guiding elements 36 of the track of FIG. 2. The element is cast and machined in steel and defines a lower ground-engaging surface 56 and two upwardly projecting and inwardly directed lugs 58. The body of the element also defines two transverse circular openings 60, each of which receives a coupling assembly (not shown in FIG. 4) similar to the coupling assemblies 43 of FIG. 3 but without the outer sleeve. The spacing between the centres of the two openings 60 is equal to the spacing between the centres of the sleeves 44 in the traction element 34.

The guiding element forms the subject of copending patent application Ser. No. 594,141 of even date herewith entitled "Guiding element for a vehicle track".

Reference will now be made to FIG. 5 in describing how the elements of the track are assembled. In the particular track configuration under discussion, three rows of traction elements are provided on each side of a single row of guiding elements (FIG. 2). FIG. 5 is a section taken at the position of one of the coupling shafts 42 of the track. Each of the shafts 42 extends through the coupling assemblies of relevant ones of the traction elements 34 and through a similar assembly 61 in the relevant guiding element 36. Each assembly 61 includes an inner hexagonal sleeve 62, similar to the sleeves 44 of FIG. 3, surrounded by a bush 64 fitted in the relevant opening 60 of the guiding element. It will be noted that the ends of the sleeves 44 and 62 project slightly from the sides of the respective elements and are arranged in abutment with one another so as to space the elements slightly transversely of the track. Each end of each shaft 42 receives a collar which is attached to the shaft by a hollow cylindrical spring pin 68.

It will be appreciated that the shafts 42 described above define the pivot axes P referred to in connection with FIG. 2. The shafts allow the track elements to turn with respect to one another about the axes P as the track curves in following its drive path in use. As the elements move about said axes P, torsional forces are applied to the elastomeric bushes 48 (in the case of the traction elements) and 64 (in the case of the guiding elements). These forces cause distortion of the bushes allowing the elements to pivot. The fact that the bushes are elliptical inhibits turning of the bushes under the effect of said torsional forces.

FIG. 5 also shows the drive sprocket 26 for the track. As can be seen, sprocket 26 is in effect a double sprocket wheel made up of two similar sprocket halves 70 coupled together by bolts 72. The respective sprocket halves 70 define similar series of sprocket teeth 74, the general shape of which can be seen from FIG. 1. The teeth of the respective sprocket halves are spaced at a distance slightly greater than the width of the guiding elements 36 so that the lugs 58 of the elements are located between the sprocket halves. As the track is driven in use, the lugs 58 of successive guiding elements pass between the sprocket halves 70 so that the track is laterally located on the vehicle. The idler wheel 28 and support wheels 30 for the track (FIG. 1) are similarly of two part construction to ensure lateral location of the track along its upper run. The road wheels 32 laterally locate the track along its lower run as will be described.

Referring back to FIG. 4, the openings 60 in the guiding element 36 are defined in part by cylindrical projections 76 located at respectively opposite sides of the element. It will be appreciated that similar projections exist at the side of element 36 which is hidden in FIG. 4. As each guiding element 36 reaches the sprocket 26 when the track is in use, the projections 76 at respectively opposite sides of the leading end of the element are engaged by the teeth 74 of the sprocket and the element is propelled forwardly by rotation of the sprocket. Subsequent teeth engage the projections 76 adjacent the trailing end of the element and take up the drive.

Figure 6:
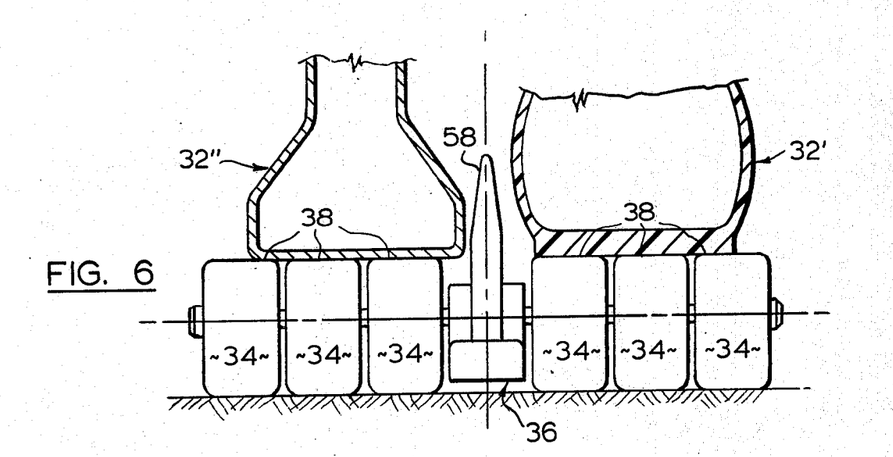
FIG. 6 is a diagrammatic vertical section through the track of FIG. 2 and illustrates two different types of vehicle road wheels which may be used in association with the track.

FIG. 6 is a simplified diagrammatic version of FIG. 3 but without the drive sprocket 26. As can be seen from FIG. 6, the upper surfaces 38 of the traction elements form a contact area for the road wheels of the vehicle to which the track is fitted. The right hand half of the drawing shows a pneumatic road wheel 32' in contact with the track. The other half of the drawing shows a fabricated metal wheel 32''. It will of course be appreciated that FIG. 6 is in effect a composite view showing two alternative road wheels and that in practice both road wheels would be the same. FIG. 6 also shows how, in the dual road wheel arrangement shown, the track is guided by the lugs 58 of the guiding elements 36. The lugs are located between the two road wheels and locate the track laterally by contact with the inner surfaces of the respective wheels.

Figure 7:
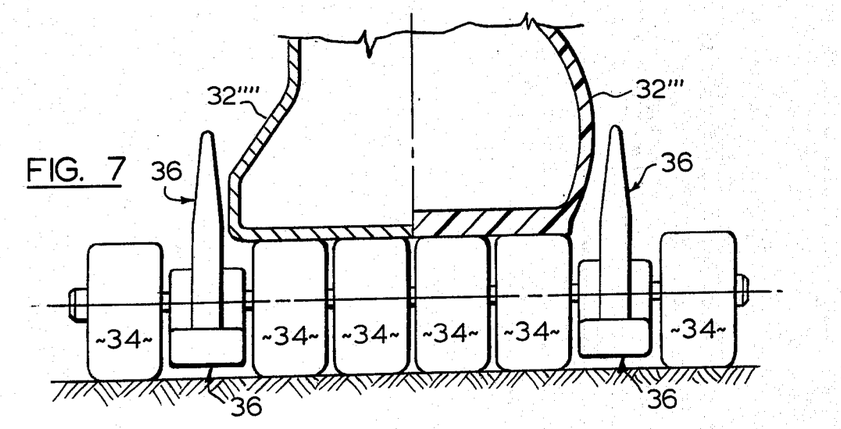
FIG. 7 is a view similar to FIG. 6 and shows how the same types of road wheel may be used in association with a different track configuration.

FIG. 7 is another composite view similar to FIG. 6. In this case, the track configuration is designed for a vehicle having single road wheels. The track will be described in more detail later but it will be apparent from FIG. 7 that it includes two rows of guiding elements 36 located adjacent respectively opposite outer edges of the track on opposite sides of a single road wheel. The right hand part of the road wheel, denoted 32''' is shown as a pneumatic wheel and the left half of the wheel 32'''' is shown as a fabricated wheel.

FIGS. 8 to 14 show examples of different symmetrical configurations of traction elements and guiding elements within the broad scope of the invention. In each view, the longitudinal median line of the track is indicated at M. Each row of traction elements is denoted by the RT prefix as used in FIG. 2 and each row of guiding elements is denoted RG. The chain dotted outlines represent additional elements which may be added to increase the width of the track. The shaded portions S in the rows RT of traction elements represent the areas of the elements contacted by the road wheel(s) of the vehicle as the track is driven in use. It will be noted that the road wheel contact pattern is entirely symmetrical in every case producing an absolutely symmetrical force generation into the track.

Figure 8:
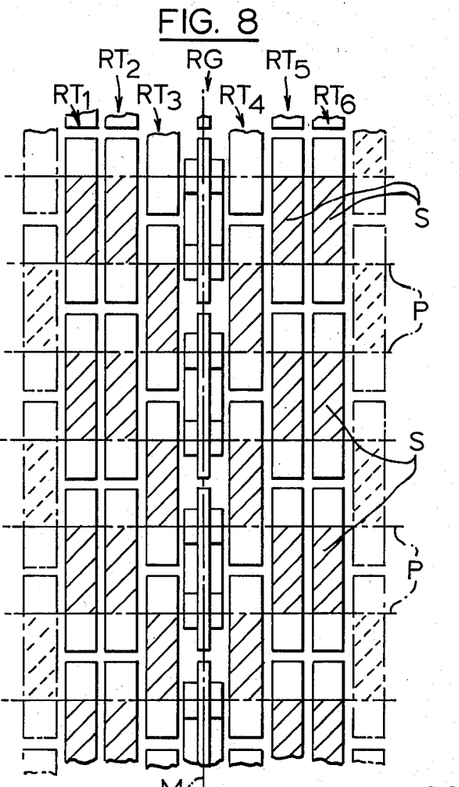
FIG. 8 is a diagrammatic plan view corresponding generally to FIG. 2.
Figure 9:
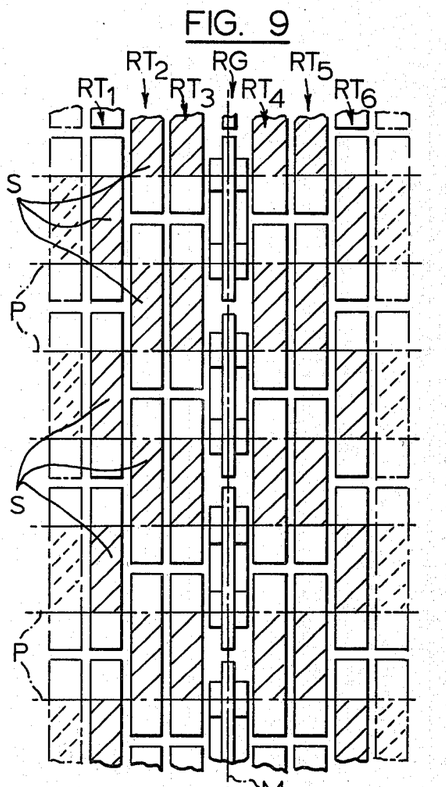
FIGS. 9 to 14 are views similar to FIG. 8 showing alternative track configurations.
Figure 10:
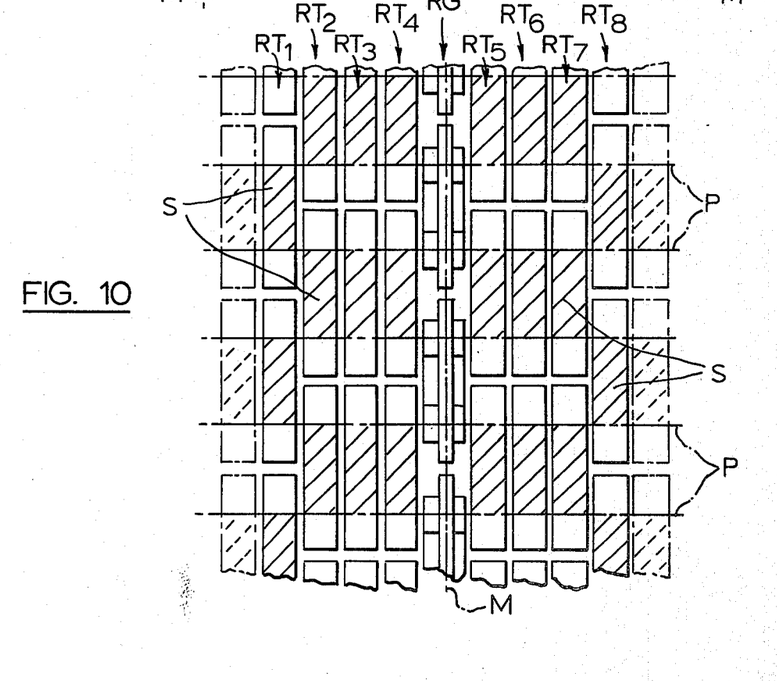
Figure 11:
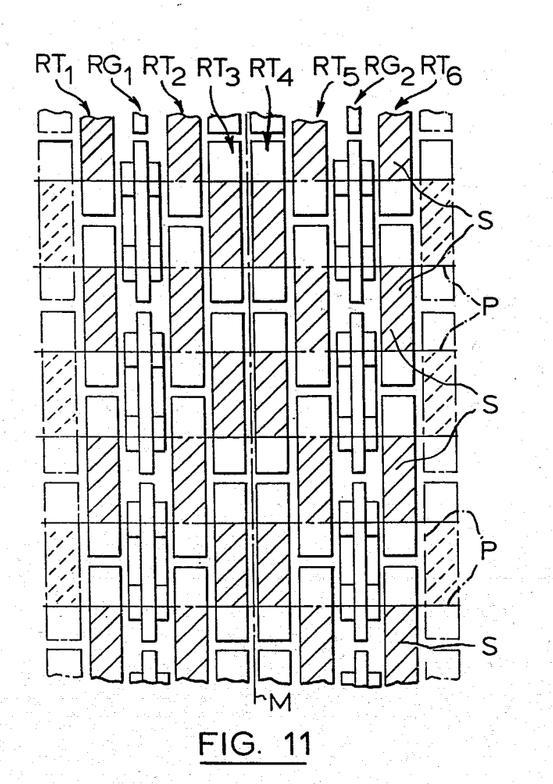
Figure 12:
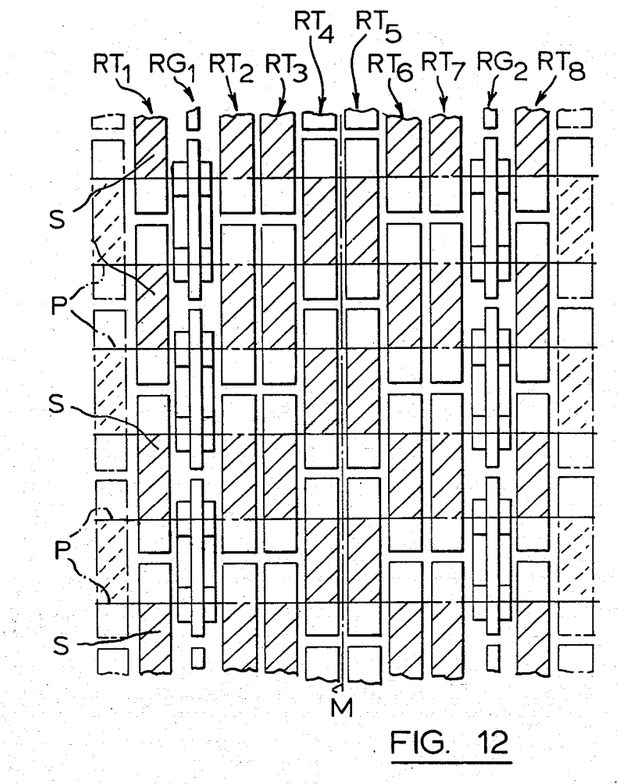
Figure 13:
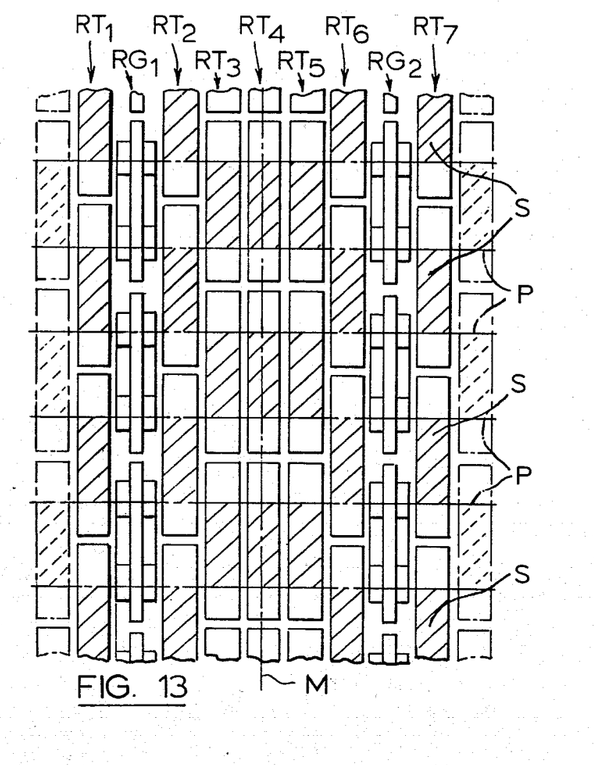
Figure 14:
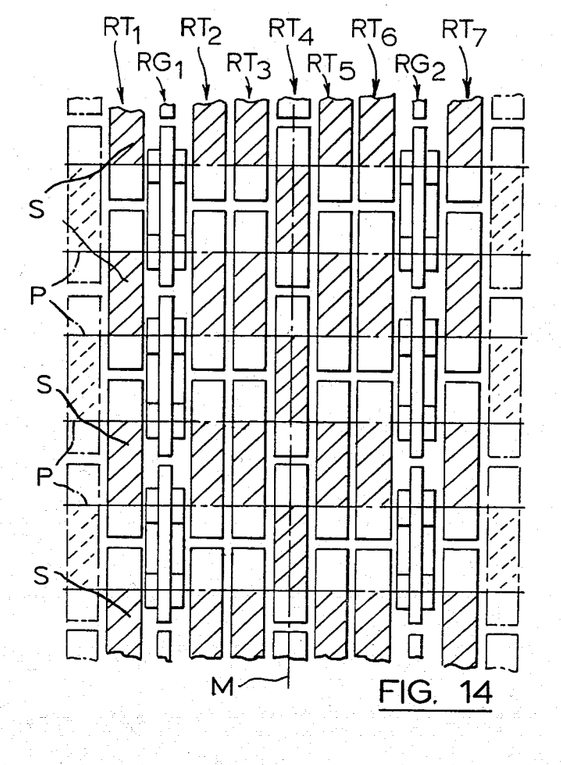

FIG. 8 shows the track configuration of FIG. 2 which has already been described. This arrangement is designed for centre guidance and dual road wheels. FIGS. 9 and 10 show alternative track configurations for centre guidance and dual road wheels. FIG. 11 shows a configuration for side guidance with a single road wheel and corresponds with FIG. 7. The remaining FIGS. 12 to 14 also show configurations for side guidance with a single road wheel.

It is to be understood that FIGS. 8 to 14 show examples of configurations within the broad scope of the invention and are not to be considered as exhaustive.

Further, it is to be appreciated that the specific forms of track element described above are not essential to the present invention. For example, the traction element need not be of the specific shape shown. Similarly, the guiding elements could be of different form. In the embodiments described above, each guiding element also acts as a driving element of the track and also a ground engaging element. This is not essential to the invention. The track could be driven by engagement with the traction elements and the guiding elements need not also engage the ground.

In the embodiments described above, each traction element and each guiding element occupies a similar area of the track. However, this is not essential within the broad scope of the invention. The traction elements and guiding elements could be of different sizes, although the distances between the pivot axes of the respective elements must always be the same.

The means coupling the track elements need not be of the type described. Any appropriate coupling arrangement providing transverse pivot axes may be employed.

The traction elements 34 may be made of any suitable elastomeric or plastic material and may each be provided with one or more internal cables or other tension members. The guiding elements 36 may be made of any suitable metal, plastic or elastomeric material. Each guiding element may have a single upwardly-projecting guiding formation. Further, the deformable bushes in the coupling assemblies of the track elements may be of any suitable elastomeric or plastic material.

It is to be understood that FIG. 1 of the drawings is merely a schematic illustration of one type of vehicle to which the track could be fitted. As has been explained, the vehicle of FIG. 1 is fitted with two tracks located at respectively opposite sides of the vehicle. In an alternative type of vehicle, additional tracks may be provided. Some or all of these tracks may be mounted on steerable sub-assemblies pivotally coupled to the body of the vehicle in question.

The drive sprocket 26 could be located adjacent the front of the vehicle and the idler wheel 28 adjacent the rear of the vehicle. Of course, the number of road wheels 32 and the number of track supporting idlers 30 may also vary. In fact the idlers may be omitted in some arrangements.

Reference may finally be made to co-pending patent application Ser. No. 594,138 of even date herewith entitled "Improvements in drive sprockets for vehicle tracks". The said application discloses an alternative drive sprocket arrangement for a track of the form described in the present application.

What I claim is:
1. An endlss track for a tracked vehicle, the track comprising:
   a plurality of track elements including:
      a. traction elements adapted for engagement with the ground in use and presenting upper road wheel contact surfaces; and,
      b. guiding elements adapted to locate the track laterally in use;
   means coupling together said track elements in an endless configuration, said means defining pivot axes which extend transversely of the track and which are arranged so that each said element is pivotable about two such axes located adjacent respectively opposite ends of the element;
   said traction elements being arranged in a plurality of parallel rows extending longitudinally of the track, and the track guiding elements being arranged in at least one row parallel to said rows of traction elements, the arrangement of the elements being symmetrical about a longitudinal median line of the track and at least two of said rows of traction elements being located on each respectively opposite side of said median line, whereby the road wheel contact area defined by the upper surfaces of said traction elements is symmetrical with respect to said median line so that, in use, the track is loaded symmetrically by road wheels on a vehicle to which the track is fitted.

2. A track as claimed in claim 1, which includes a single row of track guiding elements arranged on said longitudinal median line of the track, and at least three rows of traction elements on each side of said row of guiding elements, the elements in at least two of each of said three rows of traction elements being aligned with one another transversely of the track and the guiding elements in said row being staggered longitudinally of the track with respect to said aligned traction elements.

3. A track as claimed in claim 1, which includes: two rows of guiding elements disposed on respectively opposite sides of said longitudinal median line of the track; a row of traction elements located outwardly of each of said rows of guiding elements, the elements in said rows of traction elements being staggered longitudinally of the track with respect to the adjacent guiding elements; and at least four additional rows of traction elements located between said rows of guiding elements, the elements in at least two of the last mentioned rows of traction elements being aligned with one another transversely of the track and being aligned with the elements in said rows of traction elements disposed outwardly of the rows of guiding elements.

4. A track as claimed in claim 1, wherein each of said traction elements is in the form of an elastomeric module defining flat upper and lower surfaces and wherein said coupling means includes, adjacent each respectively opposite end of each elastomeric module, a resiliently deformable bush by which the module is coupled to adjacent elements in the track.

5. A track as claimed in claim 1 wherein each said guiding element defines oppositely directed lateral guiding surfaces for contact with corresponding surfaces on the road wheels of a vehicle to which the track is fitted, and a lower ground engaging surface, and wherein said coupling means includes, adjacent each respectively opposite ends of each guiding element, a resiliently deformable bush for the purpose of coupling the guiding element with adjacent elements in the track.

6. A track as claimed in claim 5, wherein each guiding element defines, at the position of each said bush, two laterally directed cylindrical projections which surround the ends of the said bushes and by which the track is adapted to be driven from sprocket drive means on a vehicle to which it is fitted.

7. An endless track for a tracked vehicle, the track comprising:
a plurality of track elements including:
 a. traction elements each in the form of an elastomeric module defining a flat upper road wheel contacting surface and a lower ground contacting surface and including coupling means adjacent each respectively opposite end of each elastomeric module, each said coupling means including a resiliently deformable bush by which the module is coupled to adjacent elements in the track;
 b. guiding elements adapted to locate the track laterally in use, each said guiding element defining oppositely-directed lateral guiding surfaces for contact with corresponding surfaces on the road wheels of a vehicle to which the track is fitted, and a lower ground engaging surface, and each element including coupling means adjacent each respectively opposite end of each guiding element, each said means including a resiliently deformable bush for the purpose of coupling the guiding element with adjacent elements in the track;
a plurality of transverse shafts coupling together said track elements by way of said bushes so that the track elements define an endless track configuration, said shafts defining pivot axes which extend transversely of the track whereby each said element is pivotable about two such axes located adjacent respectively opposite ends of the element;
said traction elements being arranged in a plurality of parallel rows extending longitudinally of the track, and the track guiding elements being arranged in at least one row parallel to said rows of traction elements, the arrangement of the elements being symmetrical about a longitudinal median line of the track and at least two of said rows of traction elements being located on respectively opposite sides of said median line whereby the road wheel contact area defined by the upper surfaces of said traction elements is symmetrical with respect to said median line so that, in use, the track is loaded symmetrically by road wheels on a vehicle to which the track is fitted.

8. In an endless vehicle track comprising (1) a plurality of track elements including: (a) traction elements adapted for engagement with the ground in use and presenting upper road wheel contact surfaces and (b) guiding elements adapted to locate the track laterally in use; and (2) means coupling together said track elements in an endless configuration, said means defining pivot axes which extend transversely of the track and which are arranged so that each said element is pivotable about two such axes located adjacent respectively opposite ends of the element;
the improvement wherein the traction elements are arranged in a plurality of parallel rows extending longitudinally of the track, and the track guiding elements are arranged in at least one row parallel to said rows of traction elements, and wherein the arrangement of the elements is symmetrical about a longitudinal median line of the track with at least two of said rows of traction elements located on each respectively opposite side of said median line, whereby the road wheel contact area defined by the upper surfaces of said traction elements is symmetrical with respect to said median line so that, in use, the track is loaded symmetrically by road wheels on a vehicle to which the track is fitted.

* * * * *